H. W. TITUS.
EXERCISING APPARATUS.
APPLICATION FILED JUNE 24, 1910.

1,019,861.

Patented Mar. 12, 1912.
2 SHEETS—SHEET 1.

WITNESSES:
J. Clyde Ripley.
Kate Brenner.

INVENTOR
Henry W. Titus.
BY
ATTORNEY

H. W. TITUS.
EXERCISING APPARATUS.
APPLICATION FILED JUNE 24, 1910.

1,019,861.

Patented Mar. 12, 1912.

2 SHEETS—SHEET 2.

WITNESSES:
J Clyde Ripley
Kate Brenner

INVENTOR
Henry W. Titus.
BY
C. H. Baker
ATTORNEY

UNITED STATES PATENT OFFICE.

HENRY W. TITUS, OF NEW YORK, N. Y.

EXERCISING APPARATUS.

1,019,861. Specification of Letters Patent. Patented Mar. 12, 1912.

Application filed June 24, 1910. Serial No. 568,700.

*To all whom it may concern:*

Be it known that I, HENRY W. TITUS, a citizen of the United States, and a resident of New York, in the county of New York and State of New York, have invented certain new and useful Improvements in Exercising Apparatus, of which the following is a full, clear, and exact description, whereby any one skilled in the art may make and use the same.

The invention relates to an exercising apparatus and more particularly to a device analogous to what is known as an exercising bar or bell-bar and without being cumbersome and unwieldly as in the case of a bell-bar, is so arranged and adapted that all the various forms of physical exercises for muscular development may be practiced with a simple, knock-down device which may be readily transported and may be varied as to the weights employed as desired.

The object of the invention is to provide a very simple and compact device by which muscular development may be secured through subjecting the muscles to various degrees of resistance by placing the device under different tensions.

A further object is to provide a device which will take the place of chest-weights, bar-bells, dumb-bells, chest-expanders and indian-clubs, and may be readily used in lieu of all of said devices for developing practically every muscle of the body.

A still further object is to provide a simple "knock-down" device which will occupy little space and with which various degrees of weight or the equivalent may be secured for exercising purposes.

Figure 1:
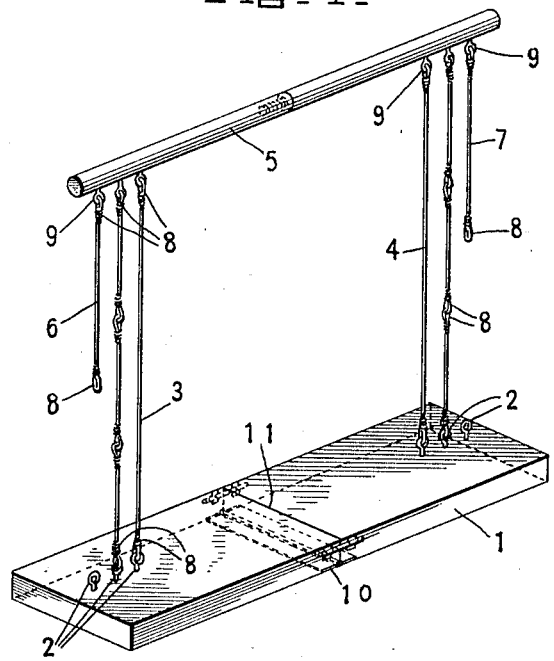
Figure 2:
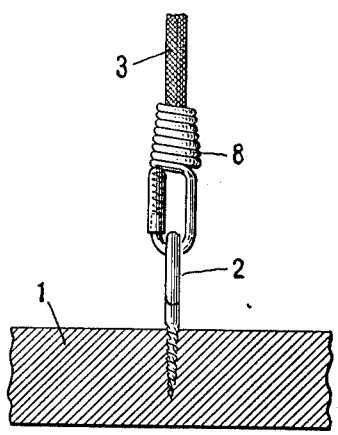

Referring to the drawings: Figure 1 is a perspective view illustrating a form of the device. Fig. 2 is a detail view illustrating one of the attaching devices for the expansible tension members. Figs. 3 to 8 inclusive are diagrammatic views illustrating some of the uses to which the device may be put in developing certain muscles of the body.

Heretofore it has been common practice to secure physical development by utilizing various forms of apparatus such as chest-weights, bar-bells, dumb-bells, chest-expanders, indian-clubs, and the like.

It is one of the principal objects of the present invention to provide a device which will make it possible to take all of the various exercises which may be taken with the above-defined pieces of exercising apparatus and so arrange the parts that various lifting strains may be secured as the muscles are developed and various combinations of the tension-devices may be employed thus producing an exercising apparatus in one structure which may be utilized for all the various forms of development of the human body.

As illustrated in Fig. 1, there is a platform or base 1, upon which the exerciser may stand either with one or both feet or lie down as indicated in the several diagrammatic views in Figs. 3 to 8 inclusive. This platform, as shown herein, is provided with eyes 2, which for convenience may be of the screw-eye form as illustrated in Fig. 2 and form a means for attaching tension-members 3, 4. Obviously, there may be any desired number of these eyes, corresponding to the number of tension-members to be employed and they may be arranged and transposed to suit the exigency of any particular case it only being important to observe that the eyes should be arranged in a row at substantially the central longitudinal line of the platform, and so located as to leave a free space between them upon which the operator may stand or lie while exercising.

As illustrated in Fig. 1, there are two long tension-members 3, 4, which may be composed of elastic or any desired spring form so that they may be stretched by the operator as he lifts or pulls upon the handle-bar 5. There are also illustrated two short tension-members 6, 7. These tension members are preferably formed with connectors 8, at each end so that they may be hooked into the eyes of the holding devices 2, of the base 1, and into similar holding devices 9, of the handle-bar 5, having the fastening devices at both ends. They may be hooked together and arranged in extension one with the other to give varying normal lengths between the base 1, and the handle-bar 5. This permits the apparatus to be quickly adjusted for persons of different heights and also provides a means for varying the weight upon the bar or the resistance to moving the bar away from the base 1. Obviously, the resistance may thus be varied to any desired degree by using different combinations of tension-members, which, of course, are supplied with the apparatus in a number sufficient to give almost an unlimited number of combinations.

It is believed the operation of the device in use is apparent. The tension-members, of course, as they are expanded, give a greater and greater resistance to the pull of the operator, the first lifting work by the operator being determined by the number and arrangement of the tension-members.

Figure 3:
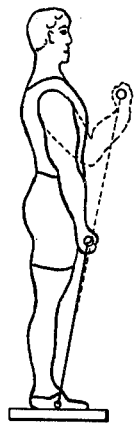

As illustrated in Fig. 3, the apparatus may be utilized for developing the biceps muscles, the handle-bar 5, being gripped by the hand of the operator with the palms up. He then raises the forearm, bending the arm at the elbow, and secures the proper tension upon the muscles to develop the biceps.

Figure 4:
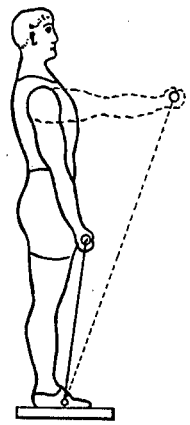

In Fig. 4 there is illustrated a movement for developing the triceps, where the arms are swung at full length without bending the elbows, raising the handle-bar against resistance offered by the resilient tension-members.

Figure 5:
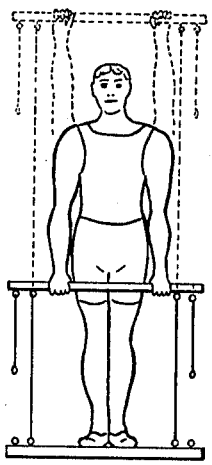

In Fig. 5, the device is shown as being used for developing the triceps, shoulder and back-muscles.

Figure 6:
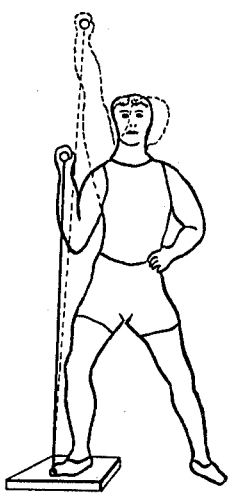
Figure 7:
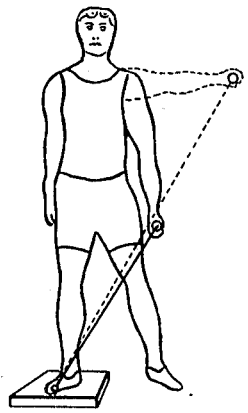
Figure 8:
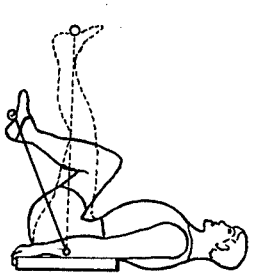

In Fig. 6 is illustrated a movement for developing the quadriceps. In Fig. 7 the pectoral-muscles are brought into play and in Fig. 8, the leg and thigh muscles as well as those of the back and abdomen are exercised. In fact, from the above illustrations, which illustrate only a part of the exercises which may be taken, it is apparent that with a single apparatus of very simple form all the beneficial results may be secured which are ordinarily attained with the various forms of exercising apparatus above enumerated.

If desired, the base-board 1, may be hinged for convenience as illustrated at 10, and securing devices 11, may be employed for holding the base in open position when it is in use. This hinging is not essential, but may be employed to make the device more compact for purposes of transportation. In similar manner, the handle-bar 5, may, if desired, be made in sections, suitably joined together so that it may be separated and closely packed with reference to the base and appurtenant parts.

Obviously, the details of the device may be varied to a considerable extent without departing from the spirit or intent of the invention and various materials may be utilized in the tension-members as well as various forms of connectors for the several parts, but the apparatus is herein shown in simple form and constitutes a device which primarily will do away with the use of heavy and cumbersome bar-bells and similar cumbersome apparatus which can only be secured and used in gymnasiums or establishments providing a great number of such devices of different weights. It is apparent that with the device herein described, any desired degree of weight or its equivalent may be secured through the tension-members which, of course, are interchangeable and may be used in various combinations or may be of different sizes, giving greater or less resistance to suit the particular form of exercise desired. With such a device, the operator may start with a very weak tension and as the muscles are developed, can gradually increase the tensions, thus giving a very gradual development to the muscular tissue which will provide the most desired form of muscle with all the attendant advantages of stimulation to the circulation and the like. The muscles with such an apparatus will be gradually developed into a long fibrous form without becoming "knotty" and improperly developed.

What I claim as my invention and desire to secure by Letters Patent is:—

1. In an exercising apparatus, a platform, eyes secured to the platform near its ends and located in a row at substantially the central longitudinal line of the platform and disposed so as to leave between them a free space upon which the operator may stand or lie while exercising, a handle bar carrying eyes which are located near its ends, and extensible elastic connections uniting the bar and platform and connected with the said eyes.

2. In an exercising apparatus, a platform, eyes secured to the platform and disposed in a row along substantially the longitudinal central line of the platform and arranged in two groups with a plurality of eyes at each group, the groups being separated so as to leave between them a free space upon which the operator may stand or lie while exercising, a handle bar carrying eyes located near its ends and arranged in groups corresponding with the groups of eyes carried by the platform, and a set of extensible connections adapted to unite the platform and the bar and arranged to be connected at the pleasure of the operator with the said eyes.

3. In an exercising apparatus, a platform divided at its transverse center to form two parts, eyes secured to the platform near its ends and located in a row at substantially the central longitudinal line of the platform and disposed so as to leave between them a free space upon which the operator may stand or lie while exercising, a handle bar carrying eyes which are located near its ends, extensible elastic connections uniting the bar and platform and connected with the said eyes, and means for locking the parts of the platform in extended position.

HENRY W. TITUS.

Witnesses:
 KATE BRENNER,
 WM. B. HILL.

Copies of this patent may be obtained for five cents each, by addressing the "Commissioner of Patents, Washington, D. C."